United States Patent
Juric

(12) 
(10) Patent No.: US 8,214,491 B2
(45) Date of Patent: Jul. 3, 2012

(54) METHOD FOR DETERMINING A NETWORK DELAY

(75) Inventor: Pero Juric, Langendorf (CH)

(73) Assignee: Swissqual License AG (CH)

(*) Notice: Subject to any disclaimer, the term of this patent is extended or adjusted under 35 U.S.C. 154(b) by 217 days.

(21) Appl. No.: 12/599,124

(22) PCT Filed: May 8, 2007

(86) PCT No.: PCT/CH2007/000233
§ 371 (c)(1),
(2), (4) Date: Nov. 6, 2009

(87) PCT Pub. No.: WO2008/134903
PCT Pub. Date: Nov. 13, 2008

(65) Prior Publication Data
US 2011/0213824 A1    Sep. 1, 2011

(51) Int. Cl.
*G06F 15/173* (2006.01)
(52) U.S. Cl. ........................................... 709/224
(58) Field of Classification Search .......... 709/224
See application file for complete search history.

(56) References Cited

U.S. PATENT DOCUMENTS

| | | | |
|---|---|---|---|
| 6,241,612 B1 * | 6/2001 | Heredia | 463/42 |
| 6,853,619 B1 | 2/2005 | Grenot | |
| 2002/0177448 A1 * | 11/2002 | Moran et al. | 455/456 |
| 2004/0111510 A1 | 6/2004 | Shoaib et al. | |
| 2007/0205896 A1 * | 9/2007 | Beber et al. | 340/572.1 |
| 2007/0283194 A1 * | 12/2007 | Villella et al. | 714/57 |
| 2008/0028009 A1 * | 1/2008 | Ngo | 707/204 |
| 2008/0075126 A1 * | 3/2008 | Yang | 370/509 |
| 2009/0172201 A1 * | 7/2009 | Carmel | 709/248 |

OTHER PUBLICATIONS

International Search Report dated Feb. 4, 2008, issued in corresponding international application PCT/CH2007/000233.

* cited by examiner

*Primary Examiner* — Wing Chan
*Assistant Examiner* — Alicia Baturay
(74) *Attorney, Agent, or Firm* — Ostrolenk Faber LLP

(57) ABSTRACT

The present invention relates to a method for determining a network delay, on a network having a first client and at least one second client, comprising the steps of time synchronizing the first client and the second client, performing an action by the first client and capturing the action and its corresponding timestamp in a first log file, capturing a reaction of the second client caused by the action of the first client and its corresponding timestamp in a second log file, and determining the network delay by computing the time difference between the timestamp of the reaction and the timestamp of the action causing the reaction through comparison of the second log file with the first log file.

7 Claims, 3 Drawing Sheets

METHOD FOR DETERMINING A NETWORK DELAY

CROSS REFERENCE TO RELATED APPLICATIONS

The present application is a 35 U.S.C. §371 National Phase conversion of PCT/CH2007/000233, filed May 8, 2007, the disclosure of which is incorporated herein by reference. The PCT International Application was published in the English language.

TECHNICAL FIELD

The invention relates to a method for determining a network delay of a network having a first client and at least one second client.

BACKGROUND

In recent years network applications such as online gaming, online meetings, web conferencing and video conferencing have been designed. Most of these network multiuser applications are developed for personal computers connected to fix networks. However, mobile wireless devices such as personal digital assistants and mobile telephones are gaining popularity and hence the above mentioned network applications are also developed for such mobile wireless devices. For example, A. Akkawi et al., "A mobile gaming platform for the IMS", Proceedings of the third ACM SIGCOMN workshop on network and systems support for games, Portland, USA, pages 77 to 84, 2004, proposes an architecture and platform for games on the IMS (internet protocol multimedia subsystem). Multiplayer games allow two or more players to play together or against each other in the same game. Networked multiplayer games are playable over a network, for example the internet. The communication range, speed, network coverage, bandwidth and latency, as well as parameters of the game client devices (processor, memory, graphics, etc.), have an influence on what kinds of multiplayer games can be developed and played. Usual game architectures follow one of the following approaches:

1. A central server design where the server receives stage change events from the users, recalculates the overall state and distributes the changes in the game state to the players (client-server based approach).

2. A distributor model where every player sends states directly to all the other players (peer-to-peer approach).

3. A zone server approach where some players are elected a zone servers. A zone server receives state changes of only a group of players and communicates with all the other players to propagate the game state changes (S. M. Riera et al., "A zone-based gaming architecture for ad-hoc networks", Proceedings of the second workshop on network and system support for games, pages 72 to 76, Redwood City, USA, 2003). Ad-hoc networks consist of a group of mobile devices that communicate with each other over wireless channels. They are typically created in a spontaneous manner. A train station or a schoolyard is typical scenarios for multiplayer gaming in an ad-hoc network.

When a mobile user moves from the multicast area of one base station to the multicast area of another base station the connection between the first base station and his mobile device is torn down and the mobile device is then found by the next base station. This is also called handover and usually causes a disturbance such as a delay or jitter in the communication or transmission path, respectively. Such a disturbance may render participation in a multi-user application, such as a multiplayer real-time game, unattractive for the user due to e.g. long response times. By jitter is meant an abrupt and unwanted variation of one or more signal characteristics, such as the amplitude, phase, pulse width, pulse position, delay or latency.

DISCLOSURE OF THE INVENTION

It is an object of the invention to provide a method for determining a network delay of a network that is employed for a multiuser application such as for example multiplayer gaming or web conferencing. Application of the method shall make it possible to estimate the subjective perception of a user, for example a player, of the network application, for example gaming.

In order to implement these and still further objects of the invention, which will become more readily apparent as the description proceeds, a method for determining a network delay of a network having a first client and at least one second client is provided, which comprises the steps of time synchronizing the first client and the second client, performing an action by the first client and capturing the action and its corresponding timestamp in a first log file, capturing a reaction of the second client caused by the action of the first client and its corresponding timestamp in a second log file, and determining the network delay by computing the time difference between the timestamp of the reaction and the timestamp of the action causing the reaction through comparison of the second log file with the first log file.

The steps of performing an action by the first client and capturing the action and its corresponding timestamp in the first log file and capturing the reaction of the second client caused by the action of the first client and its corresponding timestamp in the second log file, respectively, may be repeated several times before determining the network delay, thereby leading to a first and a second log file with several entries. Of course, the tasks of the first client and the second client may be reversed in that one or several actions are performed by the second client and the one or several actions are captured together with their corresponding timestamps in the second log file, and one or several reactions of the first client, which are caused by the one or several actions of the second client, and their corresponding timestamps are captured in the first log file. During one cycle or application of the method according to the invention the tasks of the first client and the second client may switch before determining the network delay, i.e. the first client may perform an action with the second client reacting and after that the second client may perform an action with the first client reacting and vice versa.

BRIEF DESCRIPTION OF THE DRAWINGS

Further advantageous features and applications of the invention can be found in the dependent claims as well as in the following description of the drawings illustrating the invention. In the drawings like reference signs designate the same or similar parts throughout the several figures of which:

MODES FOR CARRYING OUT THE INVENTION

Figure 1:
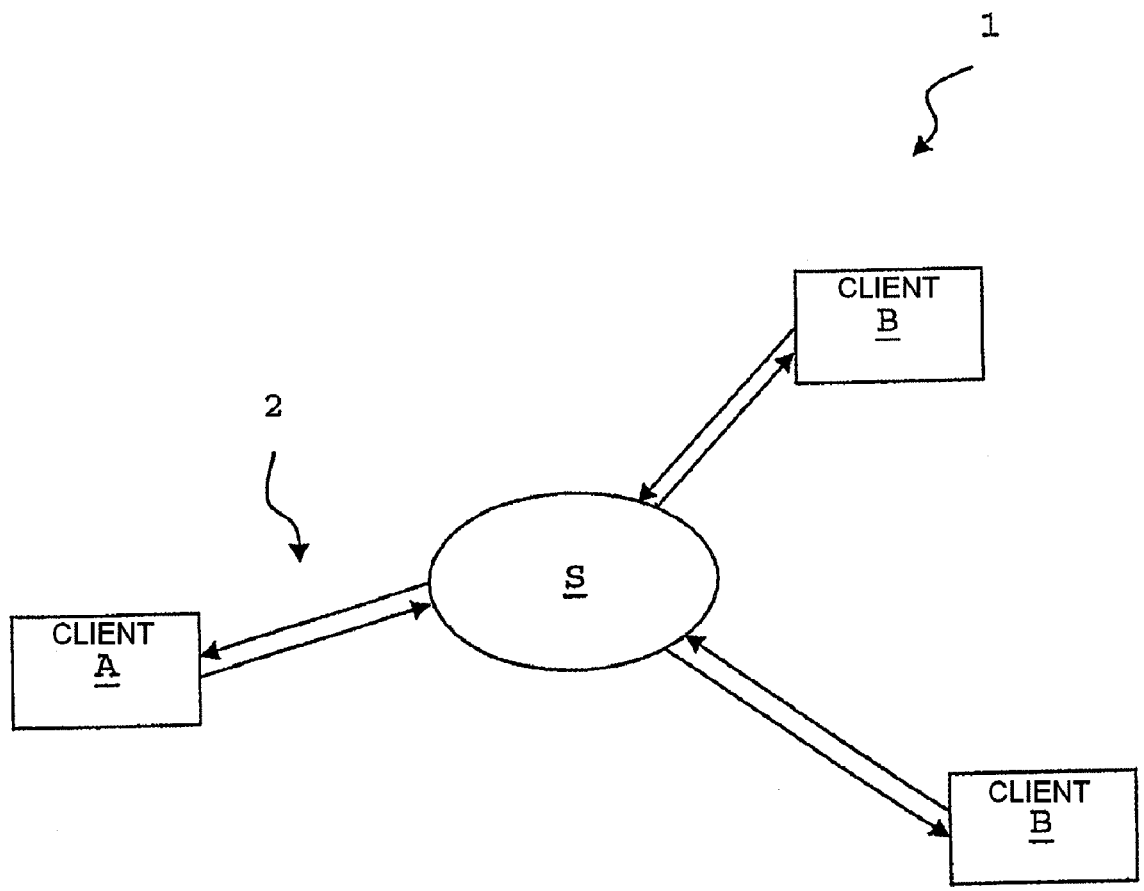
FIG. 1 shows a schematic representation of a client-server based network architecture.

FIG. 1 schematically shows a client-server based network architecture 1 in which clients A, B are separated from a server S, the server S in particular being an application server for example a game server. The network can be a communication network such as an Internet protocol network or a wireless mobile network. Also a personal area network based on Bluetooth specifications can be employed. The clients A, B communicate with the server S via transmission paths 2, which are preferably constructed such that data transmission from the clients A, B to the server S and vice versa may take place (both-way transmission). Communication from one client A to another client B is accomplished via the server S.

Figure 2:
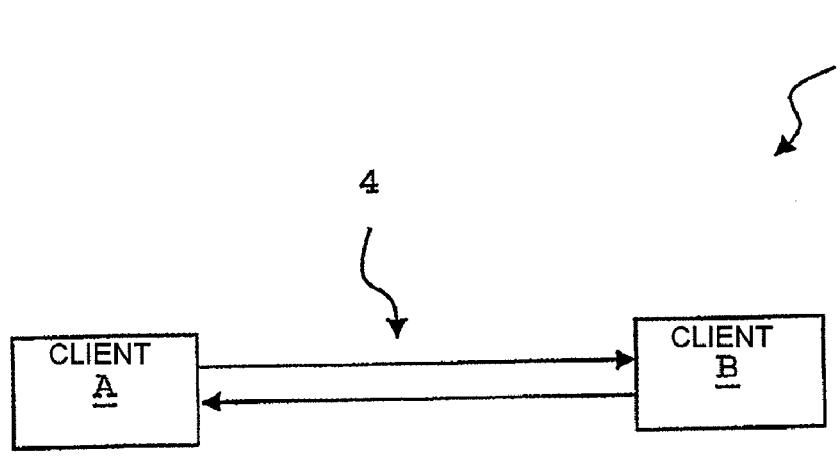
FIG. 2 shows a schematic representation of a peer-to-peer network architecture.

FIG. 2 schematically shows a peer-to-peer network architecture 3 where equal, so-called peer nodes A, B that simultaneously function as both clients and servers to the other nodes on the network communicate which each other through a transmission path 4, the transmission path 4 preferably being constructed such that both-way communication between the peer nodes A, B is possible. As for the client-server base network 1 depicted in FIG. 1 the network may be, for example, an Internet protocol network, a wireless mobile network, and/or a personal area network, respectively.

If in particular a mobile network is used disturbances may occur on the transmission paths 2, 4 when a user carrying a client A, B, which e.g. may be a so-called personal digital assistant or a mobile telephone, moves with the client A, B from the multicast area of one base station into the multicast area of another base station (so-called handover). Such disturbances may be a delay or jitter, respectively.

Figure 3:
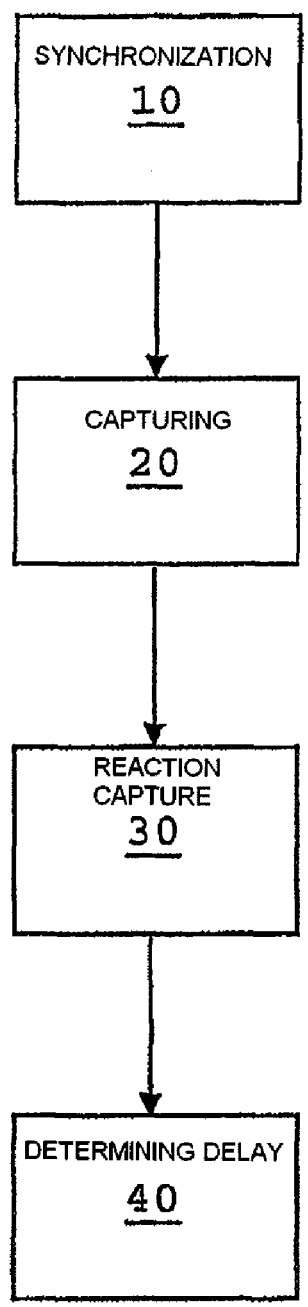
FIG. 3 shows a flowchart of the method according to the invention.

FIG. 3 depicts a flowchart of the method according to the invention for determining a network delay on a network 1 or 3 as shown in FIG. 1 or 2, respectively. In a first step 10 the clients A, B are synchronized. Of course, there may be more or less clients A, B as the number of clients A, B depicted. In a second step 20 an action is performed by a first client A, which acts as monitoring client, and the action and its corresponding timestamp are captured in a first log file associated with the first client A. By performing an action by the first client A a user is simulated. The action can, for example, be caused mechanically by pressing a key or a touch screen at a user interface of the first client A, which may be, for example, a mobile telephone. The action can also be caused virtually by running an appropriate software program, which corresponds to the pressing of a virtual key, on the first client A.

In third step 30 a reaction of the one or several second clients B, which is caused by the action of the first client A (confer step 20), and its corresponding timestamp is captured in a second log file, wherein with each second client B there is associated a second log file.

The capturing can, for example, be performed by video surveillance of a display of a user interface of the second client B, if the reaction of the second client B should be visible on its display. If the reaction of the second client B should be an audio signal, it can be captured by using a external microphone. Furthermore, pattern recognition techniques such as optical character recognition (OCR) can be employed, if the reaction of the second client B should be in form of an image of type written text which appears on its display.

Finally, in a last step 40 the network delay is determined by computing the time difference between the timestamp of the reaction and the timestamp of the action causing the reaction through comparison of the second log file with the first log file, i.e. through comparison of corresponding entries of the second log file and the first log file.

Before step 40 is performed, steps 20 and 30 may be repeated several times causing the size and the number of entries of the first log file and the second log files to increase. It is self-evident that in step 20 the action can also be performed by a second client B, whereby the action and its corresponding timestamp are then captured in a second log file. Then the reaction of the other second clients B and the first client A and the corresponding timestamp are captured in the other second log files and the first log file, the first being associated with the other second clients B and the latter being associated with the first client A. Furthermore, it is understood that there may be more than one first client A. Whereas the steps 20 and 30 are performed online, that is in real time, step 40 is preferably performed offline.

Each client A, B is preferably associated with a user interface and the capturing of an action or a reaction, respectively, of a client A, B takes preferably place in close proximity to this user interface so that not only delays on the transmission path, for example an internet protocol path, but also delays within the clients, which may for example be caused by an encoder or decoder present in each client, can be determined by the method according to the invention.

Figure 4:
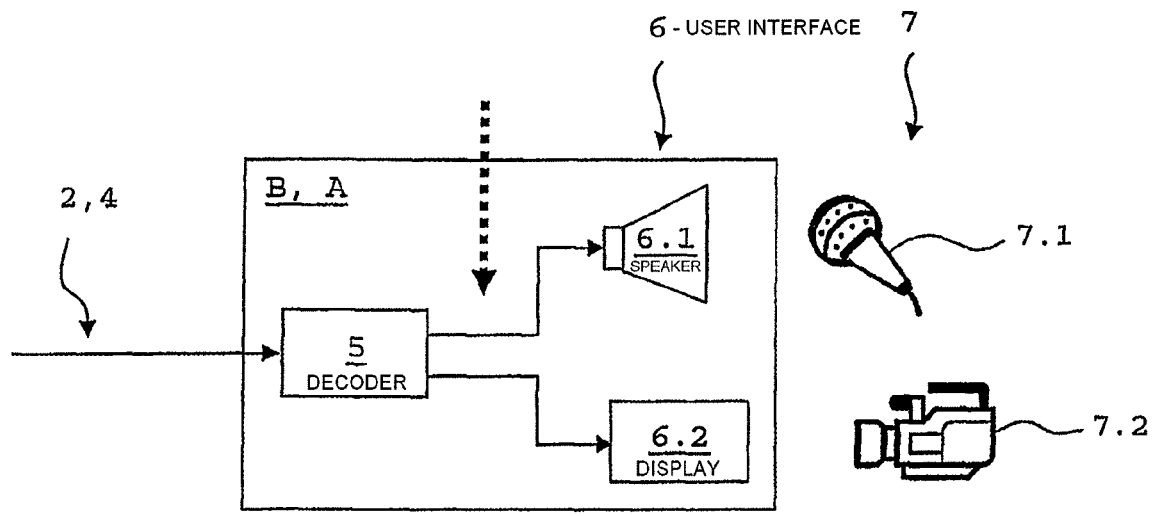
FIG. 4 shows a schematic representation of the reaction-related part of a client.

FIG. 4 depicts schematically the data receiving part, i.e. the reaction-related part, of a client A, B. A decoder 5 is located before a user interface 6 in the transmission path 2, 4. Only the receiving path of the transmission path 2, 4 is depicted for simplicity. The user interface 6 may e.g. comprise a display 6.2 and/or a loudspeaker 6.1. A reaction of the client A, B is preferably captured after the decoder 5 in the transmission path 2, 4 as indicated by the bold and dotted arrow in FIG. 4. In this way also delays inherent in the decoder 5 can be determined by the method according to the invention. Preferentially the reaction of the client A, B is even captured after the user interface 6 in the transmission path. This can, for example, be achieved, by providing appropriate capturing means 7 after the user interface 6. If the user interface 6, for example, comprises a loudspeaker 6.1 for outputting the reaction of the client A, B as an audio signal, then a microphone 7.1 can be provided as capturing means 7 for capturing this audio signal. If the user interface 6 comprises a display 6.2 for displaying the reaction of the client A, B e.g. as video signal, then a camera 7.2 can be provided as capturing to means 7 for capturing the reaction. There exist further methods of audio and/or video signal capturing, such as capturing an audio and/or video signal directly through an appropriate device from the audio and/or video output/interface of the client (e.g. a phone) or by use of a software program that runs on the client's operating system and captures the audio and/or video signal which might be represented by a digital audio or video stream by storing it into an internal (phone) memory.

Figure 5:
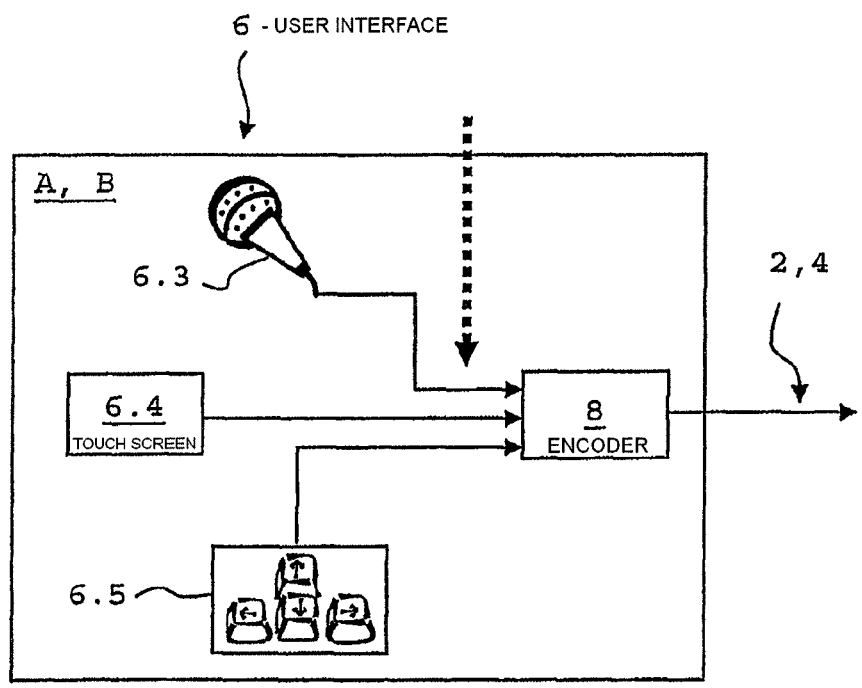
FIG. 5 shows a schematic representation of the action-related part of a client.

FIG. 5 depicts schematically the data sending part, i.e. the action-related part, of a client A, B which is responsible for sending data. The sending part of each client A, B also comprises a user interface 6. Furthermore, with each client A, B is associated an encoder 8 which is in the sending part located after the user interface 6 in the transmission parth 2, 4. For simplicity there is only depicted the sending path of the transmission path 2, 4. For performing an action the user interface 6 of the client A, B may comprise a microphone 6.3, a camera (not shown), a touch screen 6.4 and/or a key or a button 6.5. The action caused by activating the user interface 6, i.e. by pressing the touch screen 6.4 or a key 6.5, by talking into the microphone 6.3, or by making a recording with the camera, respectively, is preferably captured in the transmission path 2, 4 before the encoder 8. This is illustrated in FIG. 5 by the bold, dotted arrow. In this way also delays in the encoder 8 can be determined by the method according to the invention. The capturing can, for example, be performed by virtual capturing means such as pattern recognition software (for example OCR), the same being true for the capturing means 7 employed for capturing a reaction (confer FIG. 4).

For the purposes of the invention, the user interface 6 of the receiving part and the sending part, respectively, of a client A, B can also be realized virtually, i.e. through appropriate software.

To determine jitter on a network, which for example may occur due to handover between base stations in a mobile network, the method according to the invention, in particular steps 20 and 30, are repeated several times, thereby obtaining an estimate of the stability of the response times over the transmission paths 2, 4. By performing an action by a first client A and afterwards performing an action by a second client B (or vice versa) and capturing the caused reactions the symmetry of the data transfer over the network 1, 3 can, be evaluated. Naturally first client(s) A and second client(s) B can alternatingly perform an action and be caused to perform a reaction.

It is to be understood that while certain embodiments of the present invention have been illustrated and described herein, it is not to be limited to the specific embodiments described and shown.

What is claimed is:

1. A method for determining network delay on a network having a first client and at least one second client, the method comprising the following steps:
   a) time synchronizing the first client and the second client,
   b) performing a first action by the first client and capturing in a first log file the action and a first timestamp corresponding to the action,
   c) capturing in a second log file a reaction of the second client caused by the first action of the first client and a second timestamp corresponding to the reaction, and
   d) determining the network delay by computing a time difference between the second timestamp of the reaction and the first timestamp of the action by comparing the second log file with the first log file,
   wherein with each client is associated a user interface and the capturing of the action and/or the reaction takes place in close proximity to the user interface,
   wherein with each client is associated an encoder located after the user interface in the transmission path, and wherein the action of the client is captured before the encoder.

2. The method according to claim 1, further comprising repeating steps b) and c) before step d) is performed.

3. The method according to claim 1, wherein at least one second action is performed by the second client and the method comprises capturing in the second log file the at least one second action together with a corresponding third timestamp, wherein a reaction of the first client caused by the at least one second action of the second client and a fourth timestamp corresponding to the reaction of the first client are captured in the first log file before step d) is performed.

4. The method according to claim 1, wherein the user interface comprises a microphone, a camera, a touch screen and/or a key.

5. The method according to claim 1, wherein with each client is associated a decoder located before the user interface in the transmission path, and wherein the reaction of the client is captured after the decoder.

6. The method according to claim 5, wherein the user interface comprises a loudspeaker and/or a display.

7. The method according to claim 5, wherein the reaction is captured by a microphone and/or a camera.

* * * * *